US012227432B2

(12) United States Patent
Bunnemann et al.

(10) Patent No.: US 12,227,432 B2
(45) Date of Patent: Feb. 18, 2025

(54) FILTER CARTRIDGE

(71) Applicant: BRITA SE, Taunusstein Hessen (DE)

(72) Inventors: Phillip Bunnemann, Dornburg (DE); Tobias Schuler, Dreieich (DE); Falk Schuricht, Wiesbaden (DE); Emre Oguz, Hattersheim (DE)

(73) Assignee: BRITA SE, Taunusstein Hessen (DE)

( * ) Notice: Subject to any disclaimer, the term of this patent is extended or adjusted under 35 U.S.C. 154(b) by 496 days.

(21) Appl. No.: 17/618,003

(22) PCT Filed: Jul. 10, 2020

(86) PCT No.: PCT/EP2020/069534
§ 371 (c)(1),
(2) Date: Dec. 10, 2021

(87) PCT Pub. No.: WO2021/013581
PCT Pub. Date: Jan. 28, 2021

(65) Prior Publication Data
US 2022/0242748 A1 Aug. 4, 2022

(30) Foreign Application Priority Data
Jul. 19, 2019 (EP) .................................... 19187410

(51) Int. Cl.
*B01D 29/11* (2006.01)
*C02F 1/00* (2023.01)
(Continued)

(52) U.S. Cl.
CPC ............. *C02F 1/003* (2013.01); *B01D 29/111* (2013.01); *C02F 1/283* (2013.01); *C02F 1/42* (2013.01); *C02F 2201/006* (2013.01)

(58) Field of Classification Search
CPC ............... B01D 35/30; C02F 2001/004; C02F 2001/006
See application file for complete search history.

(56) References Cited

U.S. PATENT DOCUMENTS 5,980,743 A * 11/1999 Bairischer ............... C02F 1/003
210/291
6,841,067 B1 1/2005 Hofmann et al.
(Continued)

FOREIGN PATENT DOCUMENTS

| AU | 659539 B2 | 9/1993 |
| CN | 1229447 A | 9/1999 |

(Continued)

OTHER PUBLICATIONS

Japanese Office Action dated Jun. 10, 2024 for corresponding Japanese Application 2021-574825.

*Primary Examiner* — Bradley R Spies
(74) *Attorney, Agent, or Firm* — Hudak, Shunk & Farine Co. LPA

(57) ABSTRACT

A filter cartridge, in particular gravity-operated filter cartridge, having a body portion with at least one water outlet and a head portion with at least one water inlet and at least one air outlet, the head portion being arranged on top of the body portion, the body portion and the head portion together forming a housing with an inner volume, the head portion having a lower rim defining a bottom opening of the head portion, the filter cartridge further having a mesh located in the inner volume and attached to the head portion along the lower rim, the mesh separating the inner volume into an upper volume defined by the mesh and the head portion and a lower volume defined by the mesh and the body portion, treatment media being arranged in the lower volume. In order to improve the flow characteristics the filter cartridge has at least one holding-down device for the mesh, the holding-down device being movable from a standby position into an active position, in which the holding-down device is located at least partially between the mesh and the bottom opening.

19 Claims, 6 Drawing Sheets

(51) Int. Cl.
*C02F 1/28* (2023.01)
*C02F 1/42* (2023.01)

(56) References Cited

U.S. PATENT DOCUMENTS

2012/0012515 A1  1/2012  Nauta
2018/0194646 A1  7/2018  Camp et al.

FOREIGN PATENT DOCUMENTS

| | | |
|---|---|---|
| CN | 1867517 A | 11/2006 |
| CN | 107789887 A | 3/2018 |
| CN | 108067023 A | 5/2018 |
| CN | 207641093 U | 7/2018 |
| DE | 19631687 A1 | 2/1998 |
| EP | 1230166 B1 | 8/2004 |
| EP | 1626936 B1 | 3/2007 |
| GB | 2504501 A | 2/2014 |
| JP | 10-76253 A | 3/1998 |
| JP | 2003-514647 A | 4/2003 |
| JP | 20080886353 A | 4/2008 |
| JP | 2009-154128 A | 7/2009 |
| WO | 2004/101443 A1 | 11/2004 |

\* cited by examiner

FILTER CARTRIDGE

FIELD OF THE INVENTION

The present invention relates to a filter cartridge, a filtration device and a method for manufacturing a filter cartridge.

BACKGROUND OF THE INVENTION

Filtration devices of the above-referenced kind are being used as water filters for everyday use in households, which is why they are also called table water filters. They are primarily used for clearing tap water of unwanted substances. Among these substances are chloride and hardness builders such as calcium and magnesia, but also lead, which finds its way into tap water through the use of lead pipes, especially in older houses.

Table water filters are gravity-operated. Besides the pouring of the water, which is to be treated, into the water filter, no work is necessary for filtering the water. The water simply flows downwards through a filter cartridge and into a receptacle for the filtered water due to the gravitational force.

A filtration device is known from EP 1 230 166 B1 that comprises an inlet funnel having a bottom wall, which is provided with an opening for a filter cartridge. The filter cartridge is plugged into the opening, creating a seal between the opening and a sealing rim of the filter cartridge. In use, water is introduced into the inlet funnel from above and then flows into the filter cartridge through water inlets. Granular treatment media for the water is located inside of the filter cartridge. The treatment media usually comprises ion exchange resin and/or active coal, but other components may be used as treatment media as well. In the filter cartridge the water is treated and then exits the filter cartridge downwards through water outlets at the bottom of the filter cartridge. The filter cartridge is also provided with air outlets at its very top in order to allow air from inside the filter cartridge to exit the filter cartridge upwards at the beginning of the filtration process.

Inside the filter cartridge there is a mesh that prohibits the treatment media from exiting the openings (water inlets and air outlets) that are located in the head portion of the filter cartridge. The mesh is fixated to the head portion along its lower rim. This is usually accomplished by ultrasonic welding during the manufacturing process as follows. The head portion is arranged upside down and a strip of mesh material (e.g. from a coil) is placed onto the lower rim. An ultrasonic welding die (sonotrode) is then placed on the mesh material contact area with the rim, cutting out the mesh from the mesh material and welding the mesh to the rim at the same time. The welding die also comprises a dome-shaped part for deforming the flat mesh material prior to the cutting and welding process. When the welding die is placed on the mesh, the dome-shaped part pushes the mesh downwards forcing the mesh into a likewise dome-shaped form.

The mesh is usually made of polyethylene terephthalate (PET), polyamide (PA), polypropylene (PP) or polyethylene (PE). Choosing the mesh size is not an easy task. On the one hand, the mesh size is supposed to be as small as possible for reducing the amount of granular treatment media exiting the filter cartridge. On the other hand, the flow resistance of the mesh increases when the mesh size is reduced. If the mesh size is too small, the flow rate through the mesh could become so small that the acceptance of the consumer for how long it takes the water to be treated will suffer. In rare cases, a very small mesh size may also lead to a complete blocking of the water flow by the mesh due to the surface tension of the water hindering the escaping of air through the water present on the mesh.

This problem has already been addressed in DE 196 31 687 A1 disclosing a gravity-operated filter cartridge. The filter cartridge has a body portion with water outlets and a head portion with water inlets and air outlets, the body portion and the head portion together forming a housing with an inner volume. The filter cartridge comprises a mesh insert located in the inner volume welded to the head portion. The mesh insert comprises a dome-shaped mesh reinforced by ribs. The bulge of the dome-shaped mesh is oriented downwards in the direction of the treatment media. In use, the dome-shaped mesh comes into contact with the treatment media thereby breaking the surface tension of the water, which reduces the occurrence of mesh blockades. While this solution has been applied successfully in the past, the manufacturing effort of the filter cartridge is high due to the complexity of the mesh insert.

The problem of the present invention is to improve the flow characteristics of filter cartridges.

SUMMARY OF THE INVENTION

This problem is solved by the filter cartridge according to the invention which comprises a body portion with at least one water outlet and a head portion with at least one water inlet and at least one air outlet, the head portion being arranged on top of the body portion, the body portion and the head portion together forming a housing with an inner volume, the head portion having a lower rim defining a bottom opening of the head portion, the filter cartridge further comprising a mesh located in the inner volume and attached to the head portion along the lower rim, the mesh separating the inner volume into an upper volume defined by the mesh and the head portion and a lower volume defined by the mesh and the body portion, treatment media being arranged in the lower volume. The filter cartridge is characterized by at least one holding-down device for the mesh, the holding-down device being movable from a standby position into an active position, in which the holding-down device is located inside the upper volume at least partially between the mesh and the bottom opening.

The filter cartridge is preferably a gravity-operated filter cartridge. Terms like top, bottom, above, below, upper, lower, upwards, downwards etc. refer to the filter cartridge or its parts when the filter cartridge is in an operational orientation, e.g. when it is plugged into a seat of an inlet funnel of a filtration device.

As noted above the production process of filter cartridges usually comprises a meshing step in which the mesh is formed and attached to the head portion of the filter cartridge. The mesh has a certain form stability as a result of this process. In general, the mesh will end up in one of two more or less stable positions, one in which the bulge of the dome-shaped mesh is oriented downwards in the direction of the treatment media and one in which the bulge is oriented upwards. The upwards orientation in particular leads to the risk that the flow of water through the mesh is reduced or completely blocked.

In its active position, the holding-down device ensures that the bulge of the mesh is not oriented upwards as it is located at least partially between the mesh and the bottom opening. In other words, at least a part of the holding-down device protrudes downwards out of the bottom opening when it is in its active position.

On the other hand, the holding-down device does not obstruct the meshing step when it is in its standby position. In the standby position, no part of the holding-down device is located between the mesh and the bottom opening. In other words, no part of the holding-down device protrudes downwards out of the bottom opening when it is in its standby position. Thus the bottom opening is freely accessible.

The head portion surrounds a head volume and the body portion a body volume. The head volume is defined by walls of the head portion and the bottom opening of the head portion. When the bulge of the dome-shaped mesh is oriented downwards the upper volume equals the sum of the head volume and the volume defined by the dome shaped mesh. The body volume is defined by walls of the body portion and a top opening of the body portion. The sum of the head volume and the body volume is essentially equal to the inner volume of the filter cartridge.

The holding-down device preferably penetrates the bottom opening in the active position. This way the holding-down device is partially located in the head volume and partially located between the mesh and the bottom opening. The holding-down device further can be attached to the head portion stabilizing it in its active position.

The holding-down device and the head portion can be separate parts connected with each other or the holding-down device can be formed in one piece with the head portion. Forming them in one piece reduces the number of production steps.

If the holding-down device and the head portion are formed in one piece, the holding-down device is preferably initially formed in its standby position. This way the meshing may commence immediately after forming the head portion without further steps. Also, only one additional step is necessary after meshing in which the holding-down device is moved from its standby position to its active position.

The head portion is preferably provided with an aperture through which the holding-down device may be introduced into the upper volume. This is particularly the case when the holding-down device and the head portion are separate parts. This way the holding-down device may be introduced into the head portion after meshing. The holding-down device will then not interfere with the meshing step.

Preferably, a situation in which the holding-down device is not connected to the head portion and in which the holding-down device is not located inside the upper volume is not considered as showing an active or a standby position of the holding-down device. Such a situation can e.g. occur during production when the holding-down device is produced separately from the head portion and has not yet been introduced into the upper volume.

The filter cartridge is preferably provided with an originality seal, which connects the holding-down device with the head portion in the standby position and which breaks when the holding-down device is moved from the standby position into the active position. The originality seal can particularly be formed together with the holding-down device and the head portion when they are formed in one piece. Alternatively, the originality seal may be attached to the holding-down device and the head portion when they are formed as separate parts. The originality seal may in any case be a thin piece of polymer or a foil having perforations or the like, thus, providing one or more predetermined breaking points. The originality seal indicates to the user that the filter cartridge has not been used before.

The holding-down device may have one stable position, several stable positions or none at all. In a stable position forces usually applied to the filter cartridge as a whole, e.g. during transport or insertion into a filtration device, are not sufficient to change the position of the holding-down device. The standby and/or the active positions are preferably stable positions of the holding-down device, in particular preferably the only stable positions of the holding-down device. Stable positions increase the reliability of the filter cartridge. For moving the holding-down device from a stable standby position to a stable active position the holding-down device is preferably moved, pushed, bent and/or twisted up to a certain point against its desire to remain in the standby position. At said point the resistance of the holding-down device ends and/or the holding-down device even snaps over to the active position.

The head portion is preferably cup-shaped having a circumferential wall closed at the top by an upper wall and having the lower rim at the bottom. The upper wall is preferably flat. The air outlets are preferably located in the upper wall. In general, the air outlets are located higher than the water inlets. The water inlets are preferably all arranged at the same height. Likewise, the air outlets are preferably all arranged at the same height.

The body portion is preferably tube shaped along a main axis X of the filter cartridge having a slightly tapered side wall and being closed at the bottom except for the water outlets. The body portion can be provided with a tapered groove running vertically along the side wall. The tapered groove ensures that the filter cartridge is placed into the filtration device in a certain orientation around the main axis X by being compatible with a tongue of the filtration device.

The holding-down device is preferably a pin insertable at least partially through the aperture into the upper volume. A pin can be easily introduced into the upper volume, even after the mesh has been attached to the head portion. A (straight) pin also has the advantage of requiring only a linear motion during insertion, which can easily be automated. The aperture preferably has a seat for a certain portion of the pin having a larger cross-section than the rest of the pin, in particular for a disc-shaped portion. Said portion provides an end stop for the motion of the pin, ensuring that the desired active position of the holding-down device is reached in a reliable manner. The pin may be provided with means for holding the pin in the active position, in particular form-fitting means, making the active position stable.

Alternatively, the holding-down device is preferably of an elongated, preferably arc-like, shape formed with the head portion at its ends. In particular, the holding-down device is preferably initially formed as a part of the circumferential wall and/or of the upper wall of the head portion being cut off from the remainder of the head portion along its longitudinal side faces and being connected to the remainder of the head portion at its short end faces. With such a form the holding-down device remains flexible so that it may easily be moved from the standby position to the active position while still having stable standby and active positions.

The holding-down device is preferably provided with at least one hinge, in particular a film hinge, the hinge being arranged so that the holding-down device may be moved from the standby position to the active position by bending the holding-down device around the hinge. A film hinge can be easily integrated into production processes like injection molding reducing the overall cost of the filter cartridge. In the above alternative embodiment the hinge may be formed at the short end faces of the elongated holding-down device.

In preferred embodiments the filter cartridge is provided with locking means for fixating the holding-down device in the active position. Locking means are particularly useful when the holding-down device does not have a stable active position. In general the locking means increase the reliability of the filter cartridge with regard to the positioning of the holding-down device.

The locking means preferably comprise at least one pair of complementary locking elements to ensure a reliable connection. The pair of complementary locking elements preferably provides a form-fitting connection. In advantageous embodiments, at least one of the locking elements is attached to or formed with the holding-down device and/or at least one of the locking elements is attached to or formed with the head portion.

The pair of complementary locking elements preferably consists of one through-hole and one push-button insertable into the through-hole. Alternatively a push-button and a complementary receptacle may be implemented.

In an alternative embodiment the holding-down device is arranged loosely in the upper volume. Loosely in particular means that the holding-down device is neither connected to the head portion nor to the mesh. In such embodiments the holding-down device is essentially a weight for the mesh, the mesh being pushed down due to the gravitational force. In these embodiments the set-up of the holding-down device can be fairly simple. In particular, the holding-down device is preferably sphere-shaped. Such a shape reduces the likelihood of the holding-down device damaging the mesh.

The holding-down device is preferably made from glass or metal, in particular stainless steel. Such materials undergo very little wear when in contact with water, making them very suitable for usage in filter cartridges. Also, glass and metal usually have a fairly high density so that the holding-down device can be small in size. The diameter of the holding-down device is preferably between 10 mm and 20 mm.

The problem of the invention is also solved by a filtration device comprising an inlet funnel and a filter cartridge as described above. The filtration device may additionally comprise a receptacle in which the inlet funnel can be placed. The inlet funnel preferably comprises a seat into which the filter cartridge may be placed for usage.

The problem of the present invention is also solved by a method for manufacturing a filter cartridge comprising the following steps:
a) manufacturing a head portion
b) placing a holding-down device for a mesh into a standby position
c) attaching the mesh to a lower rim of the head portion, in particular with the head portion being oriented upside down
d) attaching the head portion and the mesh to a body portion filled with treatment media.

The steps a) to d) can, but must not be executed in the listed order. For example, step b) may follow after step c) or step d), in particular when the head portion has an aperture through which the holding-down device may be introduced into the upper volume defined by the head portion and the mesh.

In a preferred embodiment the method further comprises the step
e) moving the holding-down device from the standby position into an active position, in which the holding-down device is located at least partially between the mesh and the bottom opening.

Thus, step e) can be carried out by the customer or be part of the manufacturing method. In the latter case, step e) may be executed either after step c) or after step d).

Preferred embodiments of the method comprise steps undertaken during the manufacturing described above with regard to the filter cartridge itself.

BRIEF DESCRIPTION OF THE DRAWINGS

The invention is described by way of example with reference to the drawings showing the following.

DETAILED DESCRIPTION OF THE INVENTION

Figure 1A:
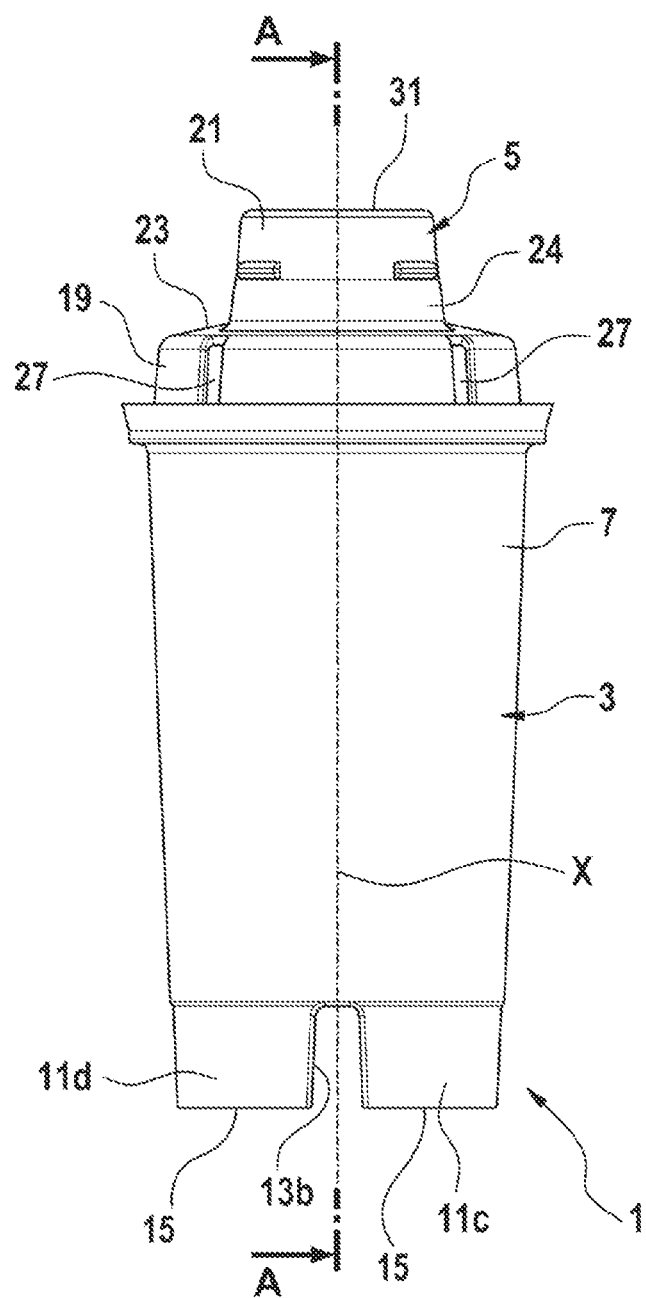
FIG. 1a a filter cartridge with a first embodiment of a head portion according to the invention in a side view FIG. 1b the filter cartridge of FIG. 1a in a bottom view FIG. 1c the filter cartridge of FIG. 1a in a top view FIG. 1d the filter cartridge of FIG. 1a in a sectional side view FIG. 2a a second embodiment of a head portion according to the invention in a perspective view FIG. 2b the head portion of FIG. 2a in a side view with the holding-down devices in their standby position FIG. 2c the head portion of FIG. 2a in a side view with the holding-down devices in their active position FIG. 3a a third embodiment of a head portion according to the invention in a perspective view FIG. 3b the head portion of FIG. 3a in a sectional side view with the holding-down devices in their standby position FIG. 3c the head portion of FIG. 3a in a sectional side view with the holding-down devices in their active position FIG. 4 a fourth embodiment of a head portion according to the invention in a schematic side view.

The filter cartridge 1 shown in FIGS. 1a to 1d comprises a body portion 3 and a head portion 5 arranged on top of the body portion 3. The body portion 3 and the head portion 5 are made of a polymer, in particular PP or PE. In FIG. 1a the filter cartridge 1 is shown in its operating orientation with the body portion 5 below the head portion 5. The filter cartridge 1 may be placed into a filtration device (not shown) in said orientation for filtering water inserted into the filtration device.

Figure 1B:
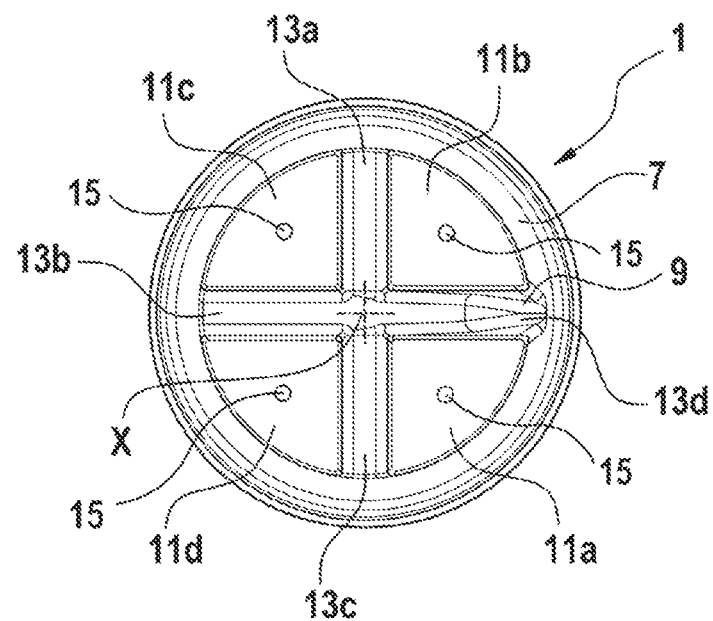
Figure 1C:
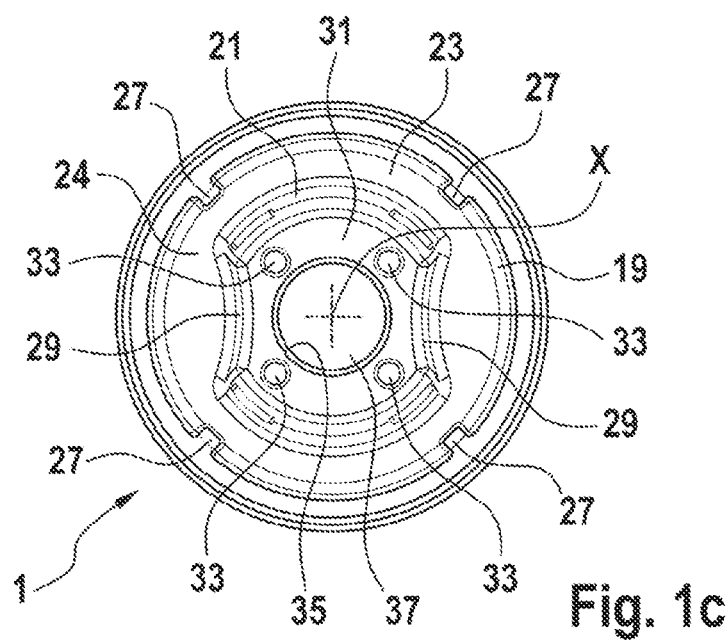
Figure 1D:
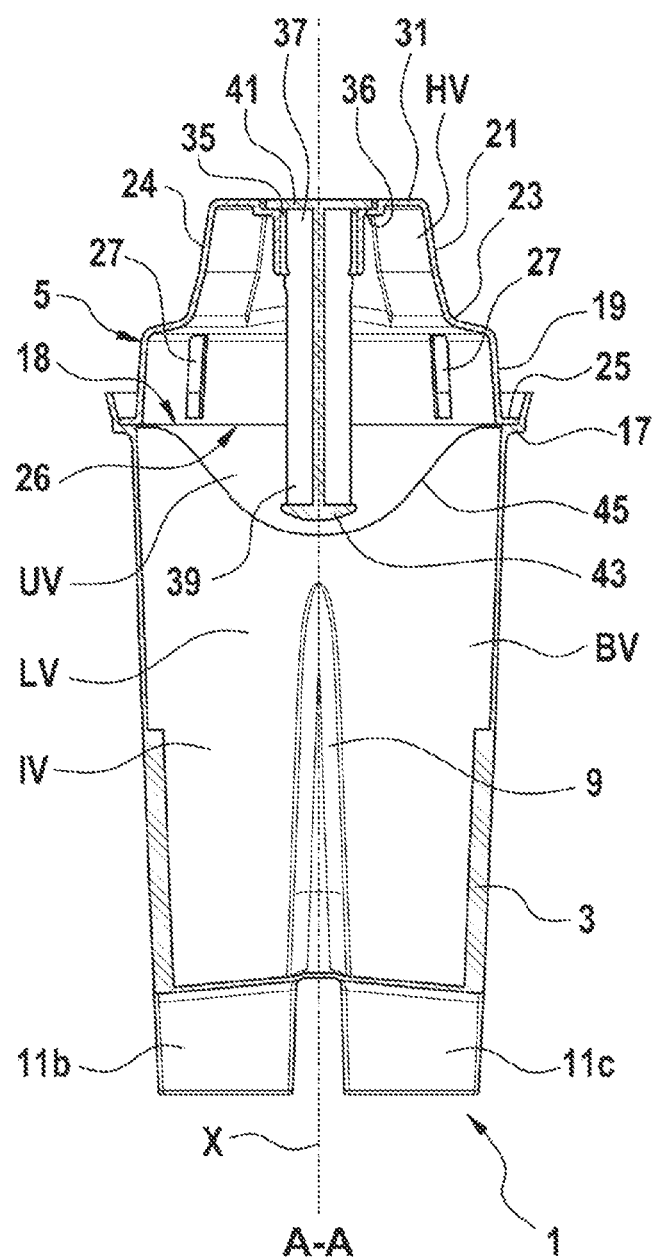

The body portion 3 is tube shaped along a main axis X of the filter cartridge 1 having a slightly tapered side wall 7. The body portion 3 is provided with a tapered groove 9 running vertically along the side wall 7 as seen in FIGS. 1b and 1d. The tapered groove 9 ensures that the filter cartridge 1 is placed into the filtration device in a certain orientation around the main axis X by being compatible with a tongue (not shown) of the filtration device.

At the bottom end of the body portion 3 four feet 11a, 11b, 11c, 11d are arranged symmetrically around the main axis X as seen in FIG. 1b. The feet 11a, 11b, 11c, 11d are formed integrally with the side wall 7. The separations of the feet 11a, 11b, 11c, 11d are achieved by horizontal grooves 13a, 13b, 13c and 13d. Each foot 11a, 11b, 11c, 11d has one water outlet 15 in the form of a round hole. Filtered water may exit the filter cartridge 1 in use via the water outlets 15.

At its upper end the body portion 3 is provided with a seat 17 for the head portion 5 as seen in FIG. 1d. The seat 17 defines a top opening 18, which is essentially circular in shape. The body portion 3 comprises a body volume BV defined by the side wall 7, the feet 11a, 11b, 11c, 11d, the grooves 9, 13a, 13b, 13c, 13d and the top opening 18.

The head portion 5 comprises a lower segment 19 and an upper segment 21 connected to each other by a transitional section 23. The lower segment 19 has a larger cross-section than the upper segment 21. The segments 19, 21 and the transitional section 23 of the head portion 5 form a circumferential wall 24 of the head portion 5. At the bottom end of the lower segment 19 the head portion 5 is provided with a lower rim 25 in the form of a flat ring. The lower rim 25 defines a bottom opening 26 of the head portion 5. The bottom opening 26 is essentially circular. As can be seen in FIG. 1d, the lower rim 25 is placed onto the seat 17 of the body portion 3.

The lower segment 19 is essentially frustoconical. Four water inlets 27 are provided in the lower segment 19 as seen in FIG. 1c. The water inlets 27 are arranged symmetrically around the main axis X.

The upper segment 21 is also essentially frustoconical, having two opposite indents 29 at which the filter cartridge 1 can be gripped by the user. At the top, the upper segment 21 is closed by a generally horizontal upper wall 31. The upper wall 31 is provided with four air outlets 33 as seen in FIG. 1c. The air outlets 33 are arranged symmetrically around the main axis X. All of the air outlets 33 are arranged higher than each one of the water inlets 27 and, as is the case here, they ideally are arranged at the highest position of the head portion 5.

The head portion 5 comprises a head volume HV defined by the segments 19, 21, the transitional section 23, the upper wall 31 and the bottom opening 26.

The upper wall 31 is provided with a central aperture 35 surrounded by a ring-shaped pin seat 36. A pin 37 is arranged in said aperture 35, the pin 37 being a holding-down device in accordance with the invention. In FIG. 1d, the pin 37 is depicted in its active position. In said active position, the pin 37 penetrates through the bottom opening 26 and partially out of the head volume HV and into the body volume BV.

The pin 37 has a main beam 39 having a cruciform cross-section. An upper disc 41 and a lower disc 43 are formed integrally with the main beam 39 at opposite ends thereof. The upper disc 41 rests on the pin seat 36 prohibiting the pin 37 from entering completely into the head volume HV. The lower disc 43 is dome-shaped.

The filter cartridge 1 has an inner volume IV consisting essentially of the head volume HV and the body volume BV. A mesh 45 is located in the inner volume IV and attached to the lower rim 25 of the head portion 5. The mesh 45 is dome-shaped and consists of a mesh material made from a polymer, in particular PET, PA, PP or PE. The mesh 45 separates the inner volume IV into an upper volume UV defined by the mesh 45 and the head portion 5, in particular the segments 19, 21, the transitional section 23 and the upper wall 31, and a lower volume LV defined by the mesh 45 and the bottom portion 3, in particular the side wall 7, the feet 11a, 11b, 11c, 11d and the grooves 9, 13a, 13b, 13c and 13d.

Water treatment media (not shown), i.e. ion exchange resin and/or active coal, is arranged in the lower volume LV.

During production the head portion 5 is formed, i.e. by injection molding, without the pin 37 in a first step. In a second step the mesh is attached to the head portion 5. For the second step the head portion 5 is preferably arranged upside down so that the bottom opening 26 is oriented upwards. A mesh material coming from a coil is then arranged on top of the rim 25. For connecting the mesh material with the head portion 5 a sonotrode having a dome-shaped part is then moved downwards onto the mesh material so that the dome-shaped part pushes the mesh material into the head volume HV. The sonotrode then welds the mesh material to the rim 25 (ultrasonic welding) and cuts out the mesh 45 from the remainder mesh material. In a next step the head portion 5 with the mesh 45 is mounted onto and connected with the body portion 3, which has previously been filled with water treatment media. Finally, the pin 37 is inserted into the head portion 5 through the central aperture 35. During the insertion, the pin 37 will push the mesh 45 downwards until it snaps over and ends up in the position shown in FIG. 1d. Due to the dome-shape of its lower disc 43, it is highly unlikely that the pin 37 will damage the mesh 45 during insertion. During usage, the pin 37 prohibits the mesh 45 from snapping back upwards, which reduces the occurrence of mesh blockades.

Figure 2A:
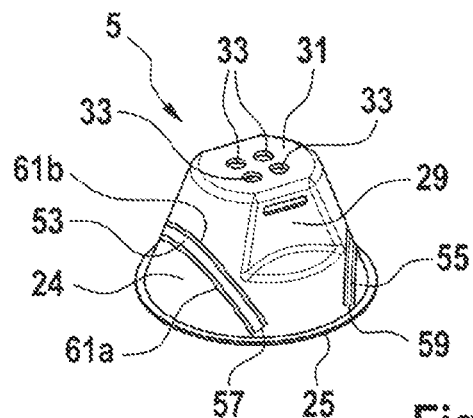
Figure 2B:
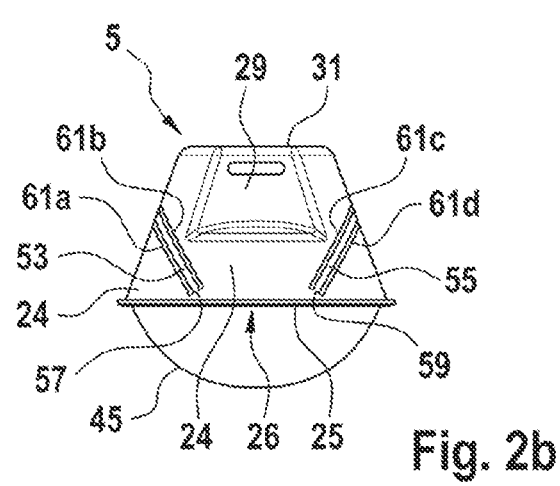
Figure 2C:
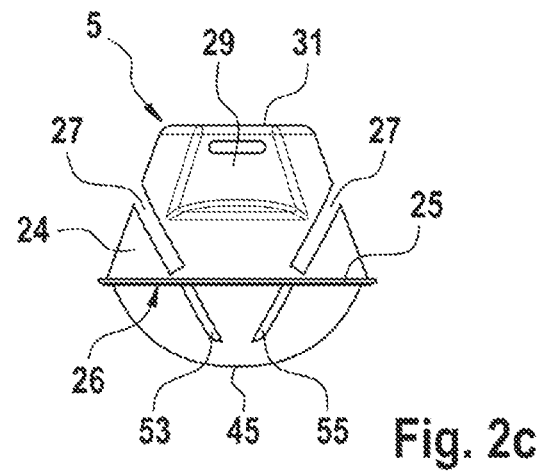

FIGS. 2a, 2b and 2c show only the head portion 5 as well as the mesh 45 of a filter cartridge. The head portion 5 has a generally frustoconical shape and comprises a circumferential wall 24, a lower rim 25 and a generally horizontal upper wall 31. The upper wall 31 is provided with four air outlets 33. The head portion 5 is made of a polymer, in particular PP or PE.

On its bottom side, the head portion 5 is provided with a bottom opening 26 defined by the lower rim 25 of the head portion 5. In the embodiment shown in FIGS. 2a, 2b and 2c the bottom opening 26 has the shape of a circle. In other embodiments the bottom opening 26 may have other shapes, even three-dimensional ones. Together with the lower rim 25, the circumferential wall 24 and the upper wall 31 the bottom opening 26 defines a head volume HV.

The mesh 45 is attached to the head portion 5 at the lower rim 25. During production of the head portion 5, a dome-shaped part of a sonotrode pushes the mesh 45 into the head volume HV before the mesh 45 is fixed to the lower rim 25. The mesh 45 itself is dome-shaped as a result of this.

Two arches 53, 55 as holding-down devices are initially formed as an integral part of the circumferential wall 24. The arches 53, 55 have a generally thin and elongated form. They are each cut off from the remainder of the circumferential wall 24 thereby forming two slits 61a, 61b, 61c, 61d along the longitudinal side faces of each of the arches 53, 55 while they are attached to the rest of the circumferential wall 24 at both of their two short ends or end faces 57, 59 (in the drawings only one end of each arch 53, 55 is shown). The connection between the ends 57, 59 of the arches 53, 55 and the circumferential wall 24 is achieved by an integral hinge (film hinge).

In FIGS. 2a and 2b the arches 53, 55 are arranged in their standby position. Due to the material of the head portion 5 and their form, the arches 53, 55 can be moved from the standby position to their active positions shown in FIG. 2c. This can be achieved by pushing the arches 53, 55 into the head volume HV, so that they are bent, pivoted around the integral hinges and finally snap over. The arches 53, 55 may be moved in unison or individually.

When the arches 53, 55 are moved to their active positions, they open up two water inlets 27 in the circumferential wall 24. In the standby position, the water inlets 27 are mostly closed by the arches 53, 55, leaving open only the slits 61a, 61b, 61c, 61d mentioned above.

In other embodiments, no slits may be present immediately after the production of the head portion 5. In such embodiments, the arches 53, 55 are initially connected to the rest of the circumferential wall 24 not only at their ends 57, 59, but also along their elongated extension. This additional connection may be thin or perforated so that it breaks when the arches 53, 55 are moved to their active position for the first time creating an originality seal for the filter cartridges.

After the initial movement into the active position, the arches 53, 55 are again attached to the circumferential wall 24 only at their ends 57, 59.

Like the arches 53, 55, the mesh 45 itself can be pushed downwards and out of the head volume HV until it snaps over into the position shown in FIGS. 2b and 2c. This can either happen by accident or it can be achieved by the arches 53, 55 being moved into their respective active position.

In the active position the arches 53, 55 penetrate through the bottom opening 26, partially exiting the head volume HV. In said active position the arches 53, 55 prohibit the mesh from snapping back up into the position shown in FIG. 2b.

Both the standby position and the active position are stable positions of the arches 53, 55, in which forces usually applied to the filter cartridge as a whole, e.g. during transport or insertion into a filtration device, are not sufficient to change the position of the arches 53, 55.

Figure 3A:
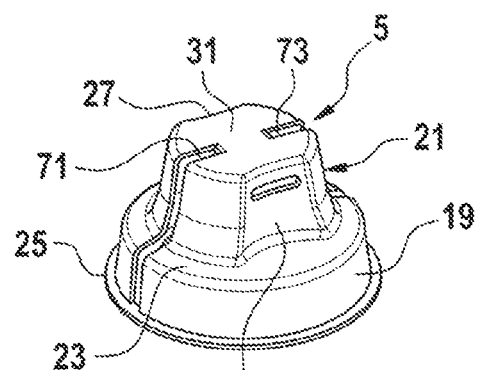
Figure 3B:
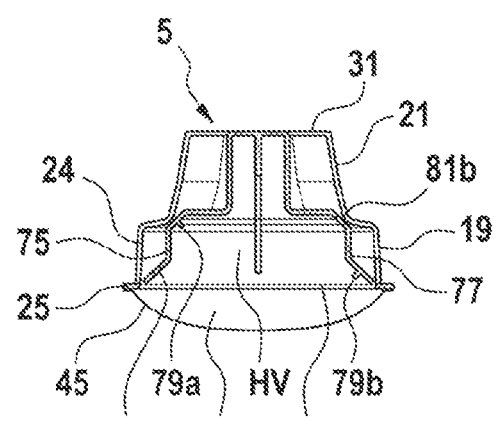
Figure 3C:
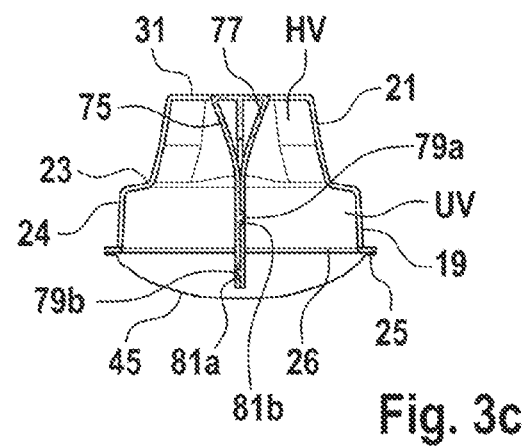

FIGS. 3a, 3b and 3c show a head portion 5 of a third embodiment of the invention. The head portion 5 again comprises a lower segment 19 and an upper segment 21 connected to each other by a transitional section 23 as well as two indents 27.

Two grooves 71, 73 are formed symmetrically in the head portion 5. FIGS. 3b and 3c show sectional views of the head portion 5. Two arms 75, 77 of a thin and elongated form are located inside the head volume HV in their standby position in FIG. 3b, the arms 75, 77 being holding-down devices. The arms 75, 77 each form a bottom part of one of the grooves 71, 73. The arms 75, 77 are each foldable by means of several film hinges. Each of the arms 75, 77 has two locking elements. Two of the locking elements are push-buttons 79a, 79b, one formed with each of the arms 75, 77, and two are through-holes 81a, 81b, one formed in each of the arms 75, 77. The push-buttons 79a, 79b and through-holes 81a, 81b are complementary such that the push-button 79a of arm 75 can enter into through-hole 81b of arm 77 forming a form-fit connection. The same applies to the push-button 79b and the through-hole 81a.

When the arms 75, 77 are moved from their standby positions into their active positions, they are bent until the push-buttons 79a, 79b and through-holes 81a, 81b interact creating said form-fit connections. FIG. 3c shows the arms 75, 77 in their active positions with the push-buttons 79a, 79b and through-holes 81a, 81b engaged with each other. The arms 75, 77 are held in their active positions by said form-fit connections.

In their active positions the arms 75, 77 penetrate through the bottom opening 26 of the head portion 5 such that the mesh 45 attached to the rim 25 of the head portion 5 is prohibited from bending upwards and entering into the head volume HV.

Figure 4:
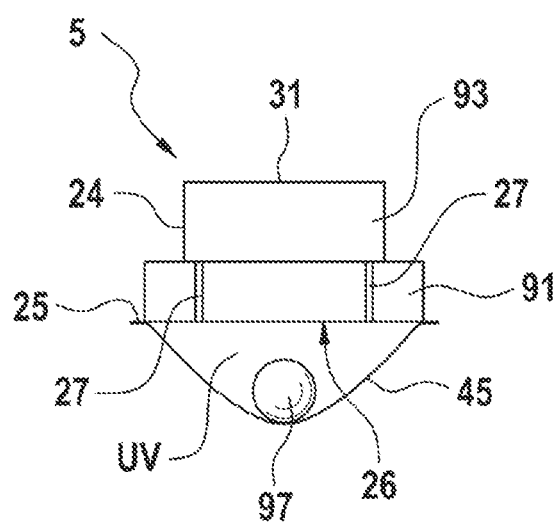

Another embodiment of the head portion 5 is shown in FIG. 4. The head portion 5 comprises a lower cylindrical section 91 and an upper cylindrical section 93 closed at the top by an upper wall 31. The lower cylindrical section 91 is provided with a lower rim 25 defining a bottom opening 26 as well as water inlets 27 and air outlets (not shown in FIG. 4).

A dome-shaped mesh 45 is again attached to the lower rim 25 of the head portion 5. The embodiment shown in FIG. 4 comprises a holding-down device in the form of a small sphere-shaped ball 97 made of stainless steel. The ball 97 can move freely within the upper volume UV defined by the head portion 5 and the mesh 45. During production the ball 97 is inserted into the head volume HV before the mesh 45 is manufactured onto the lower rim 25. With the head portion 5 upside down during production the ball 97 will most likely come to rest somewhere close to the upper wall 31 and will stay there while the mesh 45 is cut and welded to the lower rim 25. This way the ball 97 does not interfere with the production process. During production, the ball 97 is thus located in one of infinite standby positions inside the head volume HV.

After the mesh 45 is attached to the lower rim 25 the head portion 5 can be turned into the orientation shown in FIG. 4, moving the ball 97 from its standby position into an active position as shown, in which the holding-down device is located at least partially between the mesh 45 and the bottom opening 26. Since the ball 97 is arranged loosely in the upper volume UV it will shift position during normal usage. The holding-down device in this embodiment therefore has infinite active positions.

The ball 97 can also not exit the upper volume UV, because the mesh 45 is attached to the rim 25. The head portion 5 may then be attached to a body portion (not shown here) already filled with water treatment media. Due to its weight the ball 97 will hold the mesh 45 down during regular usage of the filter cartridge.

LIST OF REFERENCES 1 filter cartridge
3 body portion
5 head portion
7 side wall
9 tapered groove
11a foot
11b foot
11c foot
11d foot
13a horizontal groove
13b horizontal groove
13c horizontal groove
13d horizontal groove
15 water outlet
17 seat
18 top opening
19 lower segment
21 upper segment
23 transitional section
24 circumferential wall
25 lower rim
26 bottom opening
27 water inlet
29 indent
31 upper wall
33 air outlet
35 aperture
36 pin seat
37 pin
39 main beam
41 upper disc
43 lower disc
45 mesh
53 arch
55 arch
57 end
59 end
61a slit
61b slit
61c slit
61d slit
71 groove 73 groove
75 arm
77 arm
79a push-button
79b push-button
81a through-hole
81b through-hole
91 lower cylindrical section
93 upper cylindrical section
97 ball
BV body volume
HV head volume
IV inner volume
LV lower volume
UV upper volume
X main axis

What is claimed is:

1. A filter cartridge, in particular gravity-operated filter cartridge, comprising:
   a body portion with at least one water outlet and a head portion with at least one water inlet and at least one air outlet, the head portion being arranged on top of the body portion, the body portion and the head portion together forming a housing with an inner volume (IV), the head portion having a lower rim defining a bottom opening of the head portion,
   the filter cartridge further comprising a mesh located in the inner volume (IV) and attached to the head portion along the lower rim, the mesh separating the inner volume (IV) into an upper volume (UV) defined by the mesh and the head portion and a lower volume (LV) defined by the mesh and the body portion, treatment media being arranged in the lower volume (LV), and
   at least one holding-down device for the mesh, the holding-down device being movable from a standby position into an active position, in which the holding-down device is located inside the upper volume at least partially between the mesh and the bottom opening,
   wherein the head portion is provided with an aperture through which the holding-down device may be introduced into the upper volume (UV).

2. The filter cartridge according to claim 1, wherein the holding-down device penetrates the bottom opening in the active position.

3. The filter cartridge according to claim 1, wherein the holding-down device and the head portion are separate parts connected with each other.

4. The filter cartridge according to claim 1, wherein the holding-down device is a pin insertable at least partially through the aperture into the upper volume.

5. The filter cartridge according to claim 1, wherein the holding-down device is formed in one piece with the head portion.

6. A filter cartridge, in particular gravity-operated filter cartridge, comprising:
   a body portion with at least one water outlet and a head portion with at least one water inlet and at least one air outlet, the head portion being arranged on top of the body portion, the body portion and the head portion together forming a housing with an inner volume (IV), the head portion having a lower rim defining a bottom opening of the head portion,
   the filter cartridge further comprising a mesh located in the inner volume (IV) and attached to the head portion along the lower rim, the mesh separating the inner volume (IV) into an upper volume (UV) defined by the mesh and the head portion and a lower volume (LV) defined by the mesh and the body portion, treatment media being arranged in the lower volume (LV), and
   at least one holding-down device for the mesh, the holding-down device being movable from a standby position into an active position, in which the holding-down device is located inside the upper volume at least partially between the mesh and the bottom opening,
   wherein the filter cartridge is provided with an originality seal, which connects the holding-down device with the head portion in the standby position and which breaks when the holding-down device is moved from the standby position into the active position.

7. The filter cartridge according to claim 1, wherein the standby position and/or the active position are stable positions of the holding-down device.

8. The filter cartridge according to claim 5, wherein the holding-down device is of an elongated arc-like shape formed with the head portion at its ends.

9. A filter cartridge, in particular gravity-operated filter cartridge, comprising:
   a body portion with at least one water outlet and a head portion with at least one water inlet and at least one air outlet, the head portion being arranged on top of the body portion, the body portion and the head portion together forming a housing with an inner volume (IV), the head portion having a lower rim defining a bottom opening of the head portion,
   the filter cartridge further comprising a mesh located in the inner volume (IV) and attached to the head portion along the lower rim, the mesh separating the inner volume (IV) into an upper volume (UV) defined by the mesh and the head portion and a lower volume (LV) defined by the mesh and the body portion, treatment media being arranged in the lower volume (LV), and
   at least one holding-down device for the mesh, the holding-down device being movable from a standby position into an active position, in which the holding-down device is located inside the upper volume at least partially between the mesh and the bottom opening,
   wherein the holding-down device is provided with at least one hinge, the hinge being arranged so that the holding-down device may be moved from the standby position to the active position by bending the holding-down device around the hinge.

10. The filter cartridge according to claim 1, further including locking means for fixating the holding-down device in the active position.

11. The filter cartridge according to claim 10, wherein the locking means comprise at least one pair of complementary locking elements.

12. The filter cartridge according to claim 1, wherein the holding-down device is arranged loosely in the upper volume (UV).

13. A filtration device comprising an inlet funnel and the filter cartridge according to claim 1.

14. A method for manufacturing the filter cartridge according to claim 1, comprising the following steps:
   a) manufacturing the head portion;
   b) placing the holding-down device for the mesh into a standby position;
   c) attaching the mesh to the lower rim of the head portion, in particular with the head portion being oriented upside down;
   d) attaching the head portion and the mesh to the body portion filled with treatment media; and
   e) moving the holding-down device from the standby position, in which no part of the holding-down device is located between the mesh and the bottom opening, into an active position, in which the holding-down device is located at least partially between the mesh and the bottom opening.

15. The filter cartridge according to claim 2, wherein the holding-down device and the head portion are separate parts connected with each other, and wherein the holding-down device is a pin insertable at least partially through the aperture into the upper volume.

16. The filter cartridge according to claim 2, wherein the holding-down device is formed in one piece with the head portion.

17. The filter cartridge according to claim 2, wherein the filter cartridge is provided with an originality seal, which connects the holding-down device with the head portion in the standby position and which breaks when the holding-down device is moved from the standby position into the active position, wherein the standby position and/or the active position are stable positions of the holding-down device, and wherein the holding-down device is of an elongated arc-like shape formed with the head portion at its ends.

18. The filter cartridge according to claim 17, wherein the holding-down device is provided with at least one film hinge, the film hinge being arranged so that the holding-down device may be moved from the standby position to the active position by bending the holding-down device around the hinge, further including locking means for fixating the holding-down device in the active position, and wherein the locking means comprise at least one pair of complementary locking elements.

19. A filtration device comprising an inlet funnel and the filter cartridge according to claim 18.

* * * * *